US011032345B2

United States Patent
Cuervo Laffaye et al.

(10) Patent No.: US 11,032,345 B2
(45) Date of Patent: Jun. 8, 2021

(54) CLIENT SIDE DATA STREAM PROCESSING

(71) Applicant: Microsoft Technology Licensing, LLC, Redmond, WA (US)

(72) Inventors: Eduardo A Cuervo Laffaye, Bellevue, WA (US); Alastair Wolman, Seattle, WA (US); Stefan Saroiu, Redmond, WA (US); Sharad Agarwal, Seattle, WA (US); Paramvir Bahl, Redmond, WA (US); Landon Cox, Chapel, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/976,645

(22) Filed: May 10, 2018

(65) Prior Publication Data

US 2019/0349414 A1 Nov. 14, 2019

(51) Int. Cl.
*H04L 29/06* (2006.01)
*H04N 19/117* (2014.01)
(Continued)

(52) U.S. Cl.
CPC .......... *H04L 65/607* (2013.01); *H04L 65/602* (2013.01); *H04L 65/604* (2013.01);
(Continued)

(58) Field of Classification Search
CPC ..... H04L 65/60; H04L 65/601; H04L 65/602; H04L 65/607
See application file for complete search history.

(56) References Cited

U.S. PATENT DOCUMENTS 6,148,005 A 11/2000 Paul et al.
6,233,283 B1 5/2001 Chiu et al.
(Continued)

FOREIGN PATENT DOCUMENTS

CN 107665128 A 2/2018
WO 2014163793 A2 10/2014
WO 2016205674 A1 12/2016

OTHER PUBLICATIONS

Cuervo, et al, "Kahawai: High-Quality Mobile Gaming Using GPU Offload", In Proceedings of the 13th Annual International Conference on Mobile Systems, Applications, and Services, May 18, 2015, 15 Pages.
(Continued)

*Primary Examiner* — Jeong S Park
(74) *Attorney, Agent, or Firm* — Schwegman Lundberg & Woessner, P.A.

(57) ABSTRACT

Methods and devices for encoding and decoding data streams are disclosed. In some aspects, the data streams are multimedia data streams. One method disclosed includes obtaining, by a client device, a first multimedia data stream and a second multimedia data stream, the second multimedia data stream being a lower fidelity version of the first multimedia data stream, generating, by the client device, a third multimedia data stream based on differences between the first and second multimedia data streams, compressing, by the client device, the second multimedia data stream to generate a first compressed multimedia data stream, compressing, by the client device, the third multimedia data stream to generate a second compressed multimedia data stream; and transmitting, by the client device, the first and second compressed multimedia data steams to the server.

24 Claims, 10 Drawing Sheets

(51) Int. Cl.
*H04N 19/137* (2014.01)
*H04N 19/184* (2014.01)
*H04N 19/30* (2014.01)

(52) U.S. Cl.
CPC ......... *H04N 19/117* (2014.11); *H04N 19/137* (2014.11); *H04N 19/184* (2014.11); *H04N 19/30* (2014.11)

(56) References Cited

U.S. PATENT DOCUMENTS

| | | | |
|---|---|---|---|
| 7,432,932 | B2 | 10/2008 | San et al. |
| 7,522,167 | B1 | 4/2009 | Diard et al. |
| 7,684,495 | B2 | 3/2010 | Zhang et al. |
| 7,684,752 | B2 | 3/2010 | Perlman |
| 7,849,491 | B2 | 12/2010 | Perlman |
| 8,147,339 | B1 | 4/2012 | Perry |
| 8,396,114 | B2 | 3/2013 | Gu et al. |
| 8,396,122 | B1 | 3/2013 | Taylor |
| 8,500,558 | B2 | 8/2013 | Smith |
| 8,537,899 | B1 | 9/2013 | Taylor |
| 9,179,159 | B2 | 11/2015 | Good |
| 9,264,749 | B2 | 2/2016 | Wolman et al. |
| 9,955,194 | B2 | 4/2018 | Wolman et al. |
| 10,321,143 | B1* | 6/2019 | Mayle ............... H04L 29/06489 |
| 2004/0261113 | A1 | 12/2004 | Paul et al. |
| 2007/0094700 | A1 | 4/2007 | Wolfe |
| 2009/0119736 | A1 | 5/2009 | Perlman et al. |
| 2009/0125961 | A1 | 5/2009 | Perlman et al. |
| 2009/0125967 | A1 | 5/2009 | Perlman et al. |
| 2009/0144448 | A1 | 6/2009 | Smith |
| 2010/0007582 | A1 | 1/2010 | Zalewski |
| 2010/0026880 | A1* | 2/2010 | Ito ........................... G06T 5/002 348/352 |
| 2010/0134505 | A1 | 6/2010 | Andersen |
| 2010/0167809 | A1 | 7/2010 | Perlman et al. |
| 2010/0273553 | A1 | 10/2010 | Zalewski |
| 2010/0285879 | A1 | 11/2010 | Huang et al. |
| 2010/0285883 | A1 | 11/2010 | Zalewski |
| 2010/0304868 | A1 | 12/2010 | Zalewski |
| 2010/0306402 | A1 | 12/2010 | Russell et al. |
| 2011/0086706 | A1 | 4/2011 | Zalewski |
| 2011/0092291 | A1 | 4/2011 | Perlman |
| 2011/0118032 | A1 | 5/2011 | Zalewski |
| 2011/0124410 | A1 | 5/2011 | Mao et al. |
| 2011/0195782 | A1 | 8/2011 | Mao et al. |
| 2011/0216002 | A1 | 9/2011 | Weising et al. |
| 2011/0216060 | A1 | 9/2011 | Weising et al. |
| 2011/0246761 | A1* | 10/2011 | Alexandrov ....... H04N 21/4402 713/150 |
| 2011/0260830 | A1 | 10/2011 | Weising |
| 2011/0304713 | A1 | 12/2011 | Tardif et al. |
| 2012/0163655 | A1* | 6/2012 | Tanaka ................. H04N 19/467 382/100 |
| 2012/0258800 | A1 | 10/2012 | Mikhailov |
| 2012/0306907 | A1 | 12/2012 | Huston |
| 2012/0327113 | A1 | 12/2012 | Huston |
| 2012/0331058 | A1 | 12/2012 | Huston et al. |
| 2013/0038618 | A1 | 2/2013 | Urbach |
| 2013/0072301 | A1 | 3/2013 | Mallinson |
| 2013/0106855 | A1 | 5/2013 | Urbach |
| 2013/0132510 | A1 | 5/2013 | Ye et al. |
| 2013/0178293 | A1 | 7/2013 | Nakayama et al. |
| 2013/0212162 | A1 | 8/2013 | Somadder |
| 2013/0260896 | A1 | 10/2013 | Miura et al. |
| 2013/0268573 | A1 | 10/2013 | Lee |
| 2013/0296052 | A1 | 11/2013 | Smith |
| 2014/0032718 | A1 | 1/2014 | Berger et al. |
| 2014/0173674 | A1* | 6/2014 | Wolman ................ H04N 21/25 725/116 |
| 2015/0124888 | A1 | 5/2015 | Hwang et al. |
| 2016/0134907 | A1 | 5/2016 | Wolman et al. |
| 2016/0373502 | A1* | 12/2016 | Smith ..................... H04L 65/80 |
| 2017/0195672 | A1 | 7/2017 | He et al. |
| 2017/0223368 | A1 | 8/2017 | Abbas et al. |
| 2018/0115788 | A1* | 4/2018 | Burns ................ G06K 9/00771 |
| 2018/0146019 | A1* | 5/2018 | Chen ................... H04L 65/4069 |

OTHER PUBLICATIONS

Tan, et al, "Detection of Marine Species on Underwater Video Images", In Proceedings of the International Workshop on Advanced Image Technology, Jan. 6, 2014, pp. 192-196.

"Final Office Action Issued in U.S. Appl. No. 13/714,379", dated Jun. 27, 2014, 57 Pages.

"Non Final Office Action Issued in U.S. Appl. No. 13/714,379", dated Apr. 10, 2015, 62 Pages.

"Non Final Office Action Issued in U.S. Appl. No. 13/714,379", dated Dec. 13, 2013, 52 Pages.

"International Search Report and Written Opinion Issued in PCT Application No. PCT/US2019/029760", dated Jun. 7, 2019, 15 Pages.

Tizon, et al., "Roi Based Video Streaming for 3D Remote Rendering", In Proceedings of 13th International Workshop on Multimedia Signal Processing, Oct. 17, 2011, 6 Pages.

Yoo, et al., "Real-Time Parallel Remote Rendering for Mobile Devices using Graphics Processing Units", In Proceedings of International Conference on Multimedia and Expo, Jul. 19, 2010, pp. 902-907.

"Final Office Action Issued in U.S. Appl. No. 15/000,316", dated Aug. 21, 2017, 50 Pages.

"Non Final Office Action Issued in U.S. Appl. No. 15/000,316", dated Mar. 23, 2017, 52 Pages.

Cheng, et al., "Using Mobile GPU for General-Purpose Computing—A Case Study of Face Recognition on Smartphones", In Proceedings of International Symposium on VLSI Design, Automation and Test, Apr. 25, 2011, 4 Pages.

Chun, et al., "CloneCloud: Elastic Execution between Mobile Device and Cloud", In Proceedings of the Sixth Conference on Computer Systems (EuroSys '11), Apr. 10, 2011, 181-194.

Cuervo, et al., "MAUI: Making Smartphones Last Longer with Code Offload", In Proceedings of the 8th International Conference on Mobile Systems, Applications, and Services, Jun. 15, 2010, 14 Pages.

Flinn, et al., "Can Deterministic Replay be an Enabling Tool for Mobile Computing?", In Proceedings of the 12th Workshop on Mobile Computing Systems and Applications, HotMobile, Mar. 1, 2011, 6 Pages.

Huang, et al., "Interactive Illustrative Rendering on Mobile Devices", In Journal of IEEE Computer Graphics and Applications, vol. 27, Issue 3, May, 2007, 7 Pages.

Levoy, Marc, "Polygon-Assisted JPEG and MPEG Compression of Synthetic Images", In Proceedings of the 22nd Annual Conference on Computer Graphics and Interactive Techniques, Sep. 15, 1995, pp. 21-28.

Lietsch, et al., "A CUDA-Supported Approach to Remote Rendering", In Proceedings of the International Symposium on Visual Computing, Nov. 26, 2007, pp. 724-733.

Mann, et al., "Selective Pixel Transmission for Navigating in Remote Virtual Environments", In Proceedings of Computer Graphics Forum, vol. 16, Issue 3, Sep. 1997, 6 Pages.

Pajak, et al., "Scalable Remote Rendering with Depth and Motion-How Augmented Streaming", In Proceedings of Computer Graphics Forum, vol. 30, Issue 2, Apr. 2011, 10 Pages.

* cited by examiner

CLIENT SIDE DATA STREAM PROCESSING

BACKGROUND

Mobile devices may capture high fidelity multimedia content, including video and/or audio content, via imaging sensors and/or microphones embedded within the mobile devices. This captured multimedia content may be uploaded to data stores on the Internet, which may then make the multimedia content available to a variety of devices. In some cases, devices capturing content make use of one or more server based resources as intermediaries between the capturing and viewing devices. For example, a capturing device may stream its captured data to a streaming server. The streaming server may then store the content, and/or forward the content to viewing devices on demand. In some cases, the viewing devices may view the content "live" as it is captured and streamed by the capturing device to the server device, and then with minimal delay, forwarded to the viewing devices, such that a delay between capturing of content and viewing of content is as small as practical.

Viewing devices may vary in capability. For example, some viewing devices may be connected via a high-speed network to the streaming server while other viewing devices may be connected via a relatively lower speed network. Furthermore, some viewing devices may have large screens capable of displaying high-fidelity video, such as smart TV devices. Other devices may have a relatively smaller screen and are therefore unable to effectively make use of high-fidelity video data. Smart phone devices may be an example of these types of devices. To tailor the fidelity of content to the needs of viewing devices, streaming servers may maintain multiple copies of content such that an appropriate version of content can be available to viewing devices when needed. Alternatively, some streaming servers may dynamically create content on demand as the content is streamed to the device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
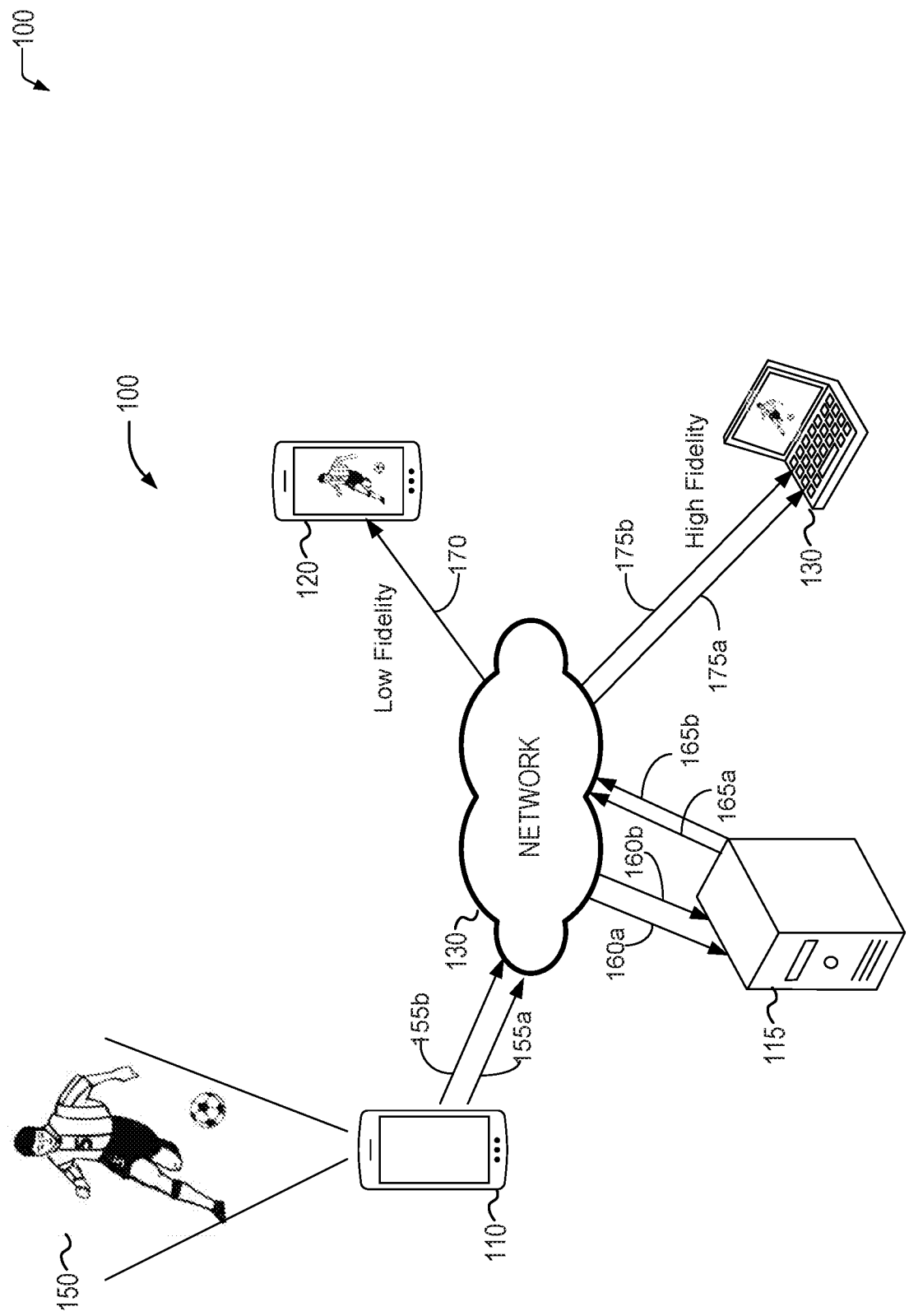
FIG. 1 is an overview diagram of a network implementing some of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The solutions described above may present a technical problem in that they place certain resource demands on server-side resources, such as streaming servers, discussed above. For example, to accommodate multiple versions of content that may be requested by the viewing devices of varying capability, the server-side resources may include persistent storage space, such as hard disk drives to store multiple versions of the same content. By storing multiple versions of the content, an appropriate version of the content may be readily available when requested by a viewing device, minimizing delay in providing the content to the viewing device. This persistent storage space does impose a cost on a provider of the server-side resources, and thus presents a technical problem that results in material impacts to the provider. Additionally, in some implementations, the server-side resources may also perform the computations to transcode incoming multimedia data to generate multiple streaming files of differing quality. In some aspects, when a server is receiving "live" video from a client side device, there may be no persistent copy of the video available from any other source. This transcoding consumes computational resources and further materially impacts the provider in these aspects.

To reduce the storage space required, some server-side implementations may store only a single copy of any particular content, such as a high-fidelity version of the content. If a lower fidelity version of the content is requested by a particular viewing device, the server-side resources may dynamically and on demand reduce the fidelity of the high-fidelity copy, and stream the resulting lower fidelity version. The fidelity of audio or video data may be based on a number of factors. For example, a video with a higher frame rate may be associated with higher fidelity than a video having a lower frame rate. Similarly, a video with higher resolution may have higher fidelity than a video with lower resolution. Both frame rate and resolution may affect an amount of data needed to encode a video having a defined length. Some embodiments disclosed herein may reduce fidelity of audio and/or video in order to reduce the size of data need to encode the data. Another factor that may affect fidelity of video is the level of detail provided in the video image. For example, video having a more consistent appearance may require a smaller amount of data to encode than another video including more variation in its images. Thus, some of the disclosed embodiments may modify video data to increase the consistency of the video, and thus provide for more efficient encoding and/or compression of the video signal, resulting in smaller storage and/or transmission bandwidth requirements for the video.

This solution reduces storage requirements from the server-side resources, but may increase computational demands on the server-side resources. For example, since multiple fidelity versions of content may not be permanently stored to reduce storage cost, in some aspects, a different fidelity version may need to be regenerated when multiple viewing devices request the different fidelity versions of the content. While these different fidelity versions may be cached for a period of time, cached information may be eventually deleted, with subsequent requests from viewing devices possibly causing regeneration of the different fidelity content.

The disclosed embodiments solve the storage and computational technical problems described above. In particular, multiple versions of content are made available to accommodate the varying needs of viewing devices. To provide these multiple versions, first, a first version of content, having a first resolution and/or fidelity is generated. Additionally, a second difference content is generated. The difference content represents differences between the first version of content and a second, higher fidelity or resolution version of the same content. By adding corresponding portions within the first version of content and the difference content, a higher fidelity portion, that corresponds in time to the portion within the first version, may be produced. Furthermore, the use of this difference technique provides for a total content size of the first version and difference content being approximately equal to the higher fidelity version of the content. Thus, server side resources may store the first version of content and the difference content for approximately the same storage cost as the higher fidelity version of the content.

When using this technical solution, if a viewing device requests a relatively low fidelity version of content, the first version of content may be provided. When a viewing device requests a higher fidelity version of content, some aspects may cause the server-side resources to combine the first version of content with the difference content to generate the high fidelity or fidelity version of content "on-demand." This higher fidelity version may then be streamed to the viewing device. Alternatively, in some aspects, the server may simply send the first version of content and the difference content to the viewing device. Upon reception, the viewing device may perform the processing to recombine the first version of content with the difference content to generate and view the higher fidelity or fidelity version of the content. With this approach, varying needs of viewing devices may be accommodated without incurring additional storage costs for the server side resources.

To further ameliorate the processing overhead that might otherwise be incurred by server side resources in generating the first version of content and difference content, some of the disclosed embodiments shift this processing from server side resources to the client device generating and/or capturing the content (e.g. live streaming). Thus, upon capturing video content for example, a mobile/client device may filter the captured video content to produce a lower fidelity version of the video content that requires fewer bytes to encode. The mobile/client device may further generate difference content based on differences between the lower fidelity version of the video content and the captured video content (which is most likely of a higher fidelity). The lower fidelity version and the difference content may then be streamed from the mobile device to server-side resources, which may alternatively store and/or forward one or more of the contents to viewing devices as appropriate. By pushing the computational overhead associated with filtering the content and generating the difference content from server-side processing resources to the client device, server-side processing resource requirements are reduced, which may also result in less cost incurred by a provider of the server side resources. Moreover, as many client devices, such as smartphones, now come equipped with system-on-chip (SOC) graphics and/or video processing accelerators, the computational burden on the client devices to perform this additional processing may be manageable, with little to no adverse effects on users of these client devices.

FIG. 1 is an overview diagram of a network implementing some of the disclosed embodiments. FIG. 1 shows mobile device 110, a server 115, a second mobile device 120, and a laptop device 130. The devices of FIG. 1 may be in network communication with each over via a network 130. The mobile devices 110 and 120, and the laptop 130 may be considered client devices, in that they send data to or receive data from the server 115. The mobile device 110 may be in a live streaming mode, capturing images of a scene 150 via an imaging sensor (not shown) and/or microphone (also not shown) included in the mobile device 110.

After capturing images of the scene 150, the mobile device 110 may transmit streams 155a-b representing the scene 150 via the network 130 to the server 115. The server may receive the data 155a-b via streams 160a-b from the network 130. The mobile device 120 may request to view a low-fidelity version of the stream provided by the device 110. In response, the server 115 may transmit data 165a via the network 130 to the client device 120, which receives the transmitted data via stream 170.

The laptop 130 may also request to view the data streamed by the mobile device 110. The laptop may request a higher fidelity version of the stream from device 110. In response, to laptop 130's request, the server 115 may provide data 165a and 165b, enabling a higher fidelity version of the stream, to the laptop 130, which receives the data via data streams 175a-b.

As shown in FIG. 1, the server 115 may support delivery of various versions of the stream 155 generated by the mobile device 110. There are several approaches that may provide this capability. For example, in some aspects, the server 115 may process the stream 160 received from the mobile device and generate separate media files that store different versions of the stream 160 for delivery to devices (e.g. 120 and 130) that request the different versions). One disadvantage of this approach is that it consumes processing power on the server when generating the multiple versions by processing the stream received from the mobile device 110. Additionally, storage requirements at the server for the multiple versions may also be substantial. Moreover, many streams from client devices may never be viewed by any other devices. Thus, unless the processing at the server is performed when requested by a viewing device, significant processing at the server may be essentially wasted processing and storing streams that are never viewed by other devices.

The disclosed embodiments solve these problems by utilizing the mobile device 110 to provide multiple versions of the stream. This approach has been generally disfavored because by generating multiple versions of the data stream at the client mobile device 110, the amount of data that may be uploaded to the server 115 may increase in some implementations. For example, if the mobile device 110 generates a low-fidelity and a high-fidelity version of a multimedia data stream, and transmits both versions to the server 115, the amount of data transmitted from the mobile device 110 to the server 115 may increase by the size of the low-fidelity version, when compared to a solution that only uploads the high-fidelity stream to the server 115.

The disclosed embodiments solve this problem by using the mobile device 110 to provide the multiple versions of a high-fidelity data stream via the generation of a low-fidelity version of the high-fidelity data stream and another stream representing a difference between the provided low-fidelity version of the data stream and a higher fidelity version of the data stream (called the "difference" stream). The combined size of the low-fidelity stream along with the difference stream is approximately equivalent to that of the high-fidelity stream used to generate the two streams. Using the low-fidelity stream and difference stream, another device may regenerate the higher fidelity data stream. Thus, using this approach, the mobile device 110 facilitates the delivery of multiple versions of its data stream without increasing the amount of data transmitted between the mobile device 110 and the server 115. Furthermore, because the mobile device 110 performs the processing necessary to generate the low-fidelity stream and the difference stream from the high-fidelity stream, processing requirements for the server 115 are reduced relative to implementations that rely on the server to do this processing.

Using this approach, the server 115 may transmit the low-fidelity version of the data stream 155a/160a to the mobile device 120 and transmit both the low-fidelity stream and the difference stream 155a-b/165a-b to the device 130. Upon receiving the low-fidelity steam and the difference stream (represented as 175a-b in FIG. 1, the device 130 may combine the two streams to generate a higher fidelity version of the stream. The device 130 may then write the higher fidelity version to an output device, such as a speaker or an electronic display included with the device 130.

While FIG. 1 shows devices 110 and 120 as mobile devices, and specifically illustrated as smart phone devices, the devices 110, 120, and 130 may take on any form factor. In various aspects, the devices 110, 120, and 130 may be any type of computing device configured to communicate over the network 130.

Figure 2:
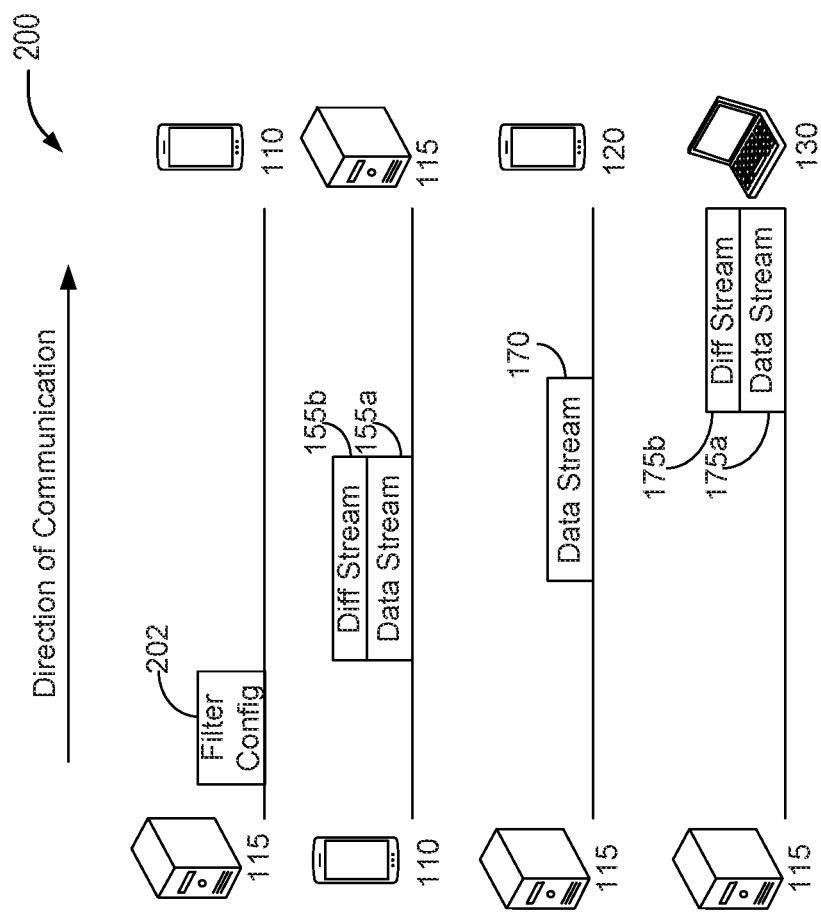
FIG. 2 is a message sequence diagram illustrating how the devices of FIG. 1 may exchange messages in some of the disclosed embodiments

FIG. 2 is a message sequence diagram illustrating how the devices of FIG. 1 may exchange messages in some of the disclosed embodiments. The message sequence 200 begins with the server 115 transmitting a filter configuration message 202 to the mobile device 110. The filter configuration message 202 may indicate how many filters are to be applied to a captured data stream before transmission to the server 115. The filter configuration message 202 may also indicate in some embodiments one or more identifiers for one or more of the filters to be applied. In some aspects, the filter configuration message 202 may include instructions implementing one or more of the filters to be applied. For example, in some aspects, the instructions may be in the form of intermediate code, such as Java byte codes, common intermediate language (CIL), or Microsoft intermediate language (MSIL). In some aspects, the instructions may be in the form of a script language, such as Python, Perl, JavaScript, or VBscript.

Message sequence 200 also shows the mobile device 110 transmitting a data stream 155a and difference stream 155b to the server 115.

Upon receiving the data stream 155a and difference stream 155b, the server 115 may transmit the data stream received as 155a from the mobile device 110 to the mobile device 120 as data stream 170. The server may also transmit the data stream received as 155a from the mobile device 110 to the laptop device 130 as data stream 175a. Because the laptop 130 may have requested a higher fidelity version of content generated by the mobile device 110, the server 115 may also transmit the difference stream 175 to the laptop 130. Upon reception of the data stream 175a and difference stream 175b, the laptop 130 may combine the two streams to generate a higher fidelity version of the data stream.

Figure 3:
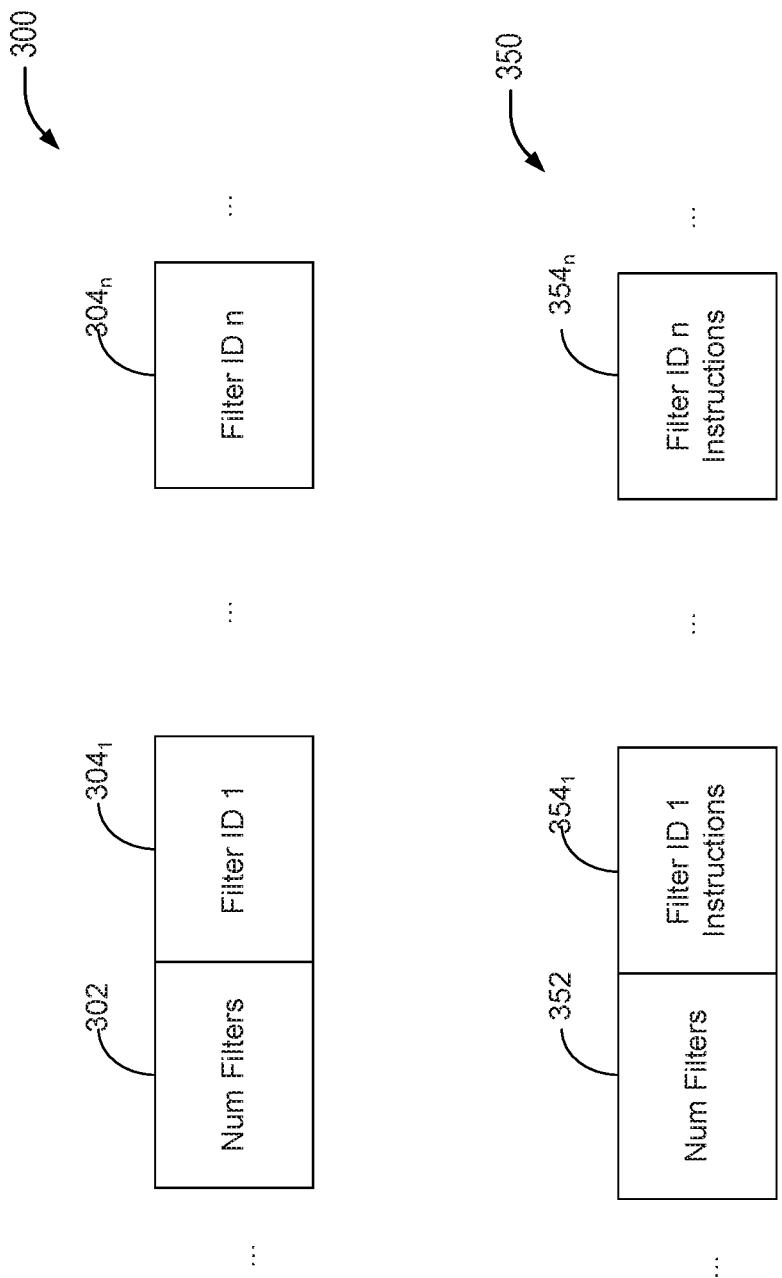
FIG. 3 shows two embodiments of a portion of a filter configuration message.

FIG. 3 shows two embodiments of a portion of a filter configuration message 202. A first embodiment shows a portion 300 including a number of filters field 302, and one or more filter identification fields $304_{1-n}$. The number of filters field 302 indicates a number of filters to be applied to a captured data stream before transmission to a device transmitting the filter configuration message portion 300 (e.g. server 115). The filter identification fields $304_{1-n}$ identify the filters to be applied. In some aspects, the mobile device 110 and server 115 share associations between filter identifiers and instructions implementing the filters. In some aspects, the associations may be hard coded in each of the mobile device 110 and server 115, or may be dynamically retrieved periodically from a network based storage location (e.g. via a web service). In some aspects, instructions implementing the filters may also be available from the network based storage location also.

FIG. 3 shows another embodiment of a portion 350 of a filter configuration message 202. The portion 350 includes a number of filters field 352 and filter instructions $354_{1-n}$. The filter instructions $354_{1-n}$ implement filters to be applied on the captured data stream by a device (e.g. mobile device 110) receiving the filter configuration message portion 350. In some aspects, the instructions may be in a form of java byte codes, common intermediate language (CIL), or Microsoft intermediate language (MSIL). In some aspects, the instructions may be for a script based language, such as Python, VB script, JavaScript, Perl, or any other scripting language. In these aspects, the receiving device (e.g. mobile device 110) may implement an interpreter for the scripting language instructions or the intermediate language included in the message portion 350. In some aspects, one or more of the portions 300 and 350 may be included in an HyperText Transfer Protocol (http) response message which forms the filter configuration message 202. In other aspects, one or more of the portions 300 and 350 may be included in a different type of message.

Figure 4A:
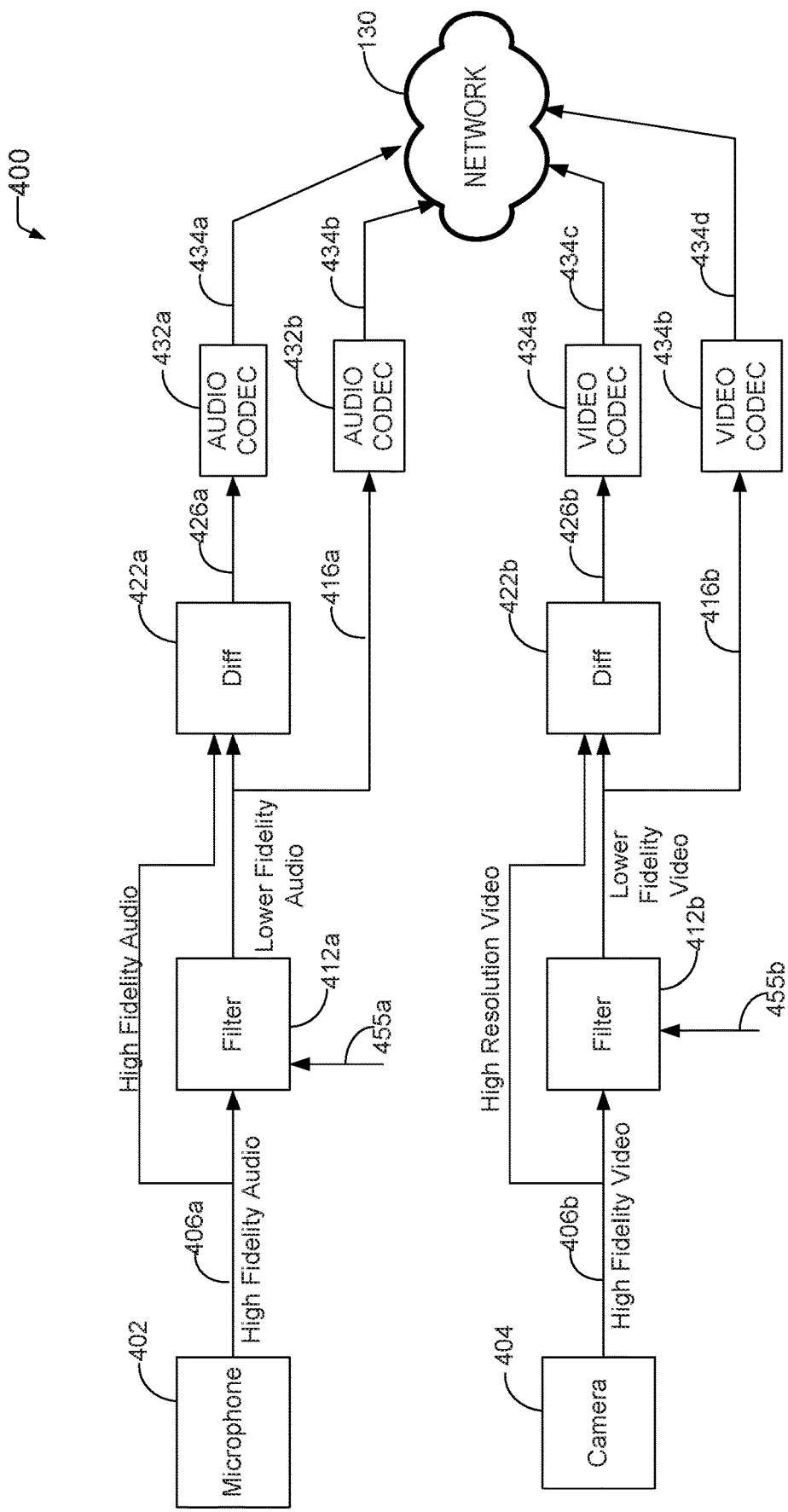
FIG. 4A is a data flow diagram that may be implemented in some of the disclosed embodiments.

FIG. 4A is a data flow diagram that may be implemented in some of the disclosed embodiments. For example, the data flow 400 may be implemented by the mobile device 110 in some embodiments. The data flow 400 shows a microphone 402 and a camera 404. The microphone 402 and camera 404 generate data 406a and 406b respectively. The data 406a-b are provided to filters 412a-b respectively. The filters 412a-b function to reduce the resolution and/or fidelity of the data 406a-b such that it may be represented using a smaller number of bits. In some aspects, the filters may be specialized for audio data or video data respectively. For example, the filter 412a may quantize the audio data 406a to reduce the size requirements for the audio data 406a. Similarly, the filter 412b may reduce the fidelity of video information included in the video data 406b. In some aspects, the filter 412b may be a low motion blur filter (e.g. a median blur filter). Other filter types are contemplated.

Each of the filters 412a-b generate lower fidelity or resolution data 416a-b. The filters 412a-b may be responsive to filter configuration signals 455a-b. The filter configuration signals 455a-b may be derived from the filter configuration message 202 in some aspects. For example, in some aspects, the filters 412a-b may implement multiple filters.

An active filter of the multiple filters may be selected by the filter configuration signals 455*a-b* for the filters 412*a-b* respectively. In some aspects, one or more of the filters 412*a-b* may be implemented in video encoding acceleration circuitry included in a device implementing the data flow 400 (e.g. client device 110).

The data 416*a-b* are provided to difference calculators 422*a-b* respectively. The higher fidelity/resolution streams 406*a-b* from the microphone 402 and camera 404 respectively are also provided to the difference calculators 422*a-b*. The difference calculators 422*a-b* compute differences between the input streams 406 and 416 and generate difference streams 426*a-b* respectively. In some aspects, one or more of the filters 412*a-b* may be implemented via a video encoding accelerator circuit included in the device implementing data stream 400.

The difference calculators 422*a-b* may determine differences between the higher fidelity streams 406*a-b* and lower fidelity streams 416*a-b* respectively. In some aspects, the difference calculators 422*b* may compute pixel by pixel differences between corresponding pixel values and generate the stream 428*b* to include the differences. In some aspects, one or more of difference calculators 422*a-b* may be implemented in video acceleration circuitry included in a device implementing data flow 400 (e.g. client device 110).

The streams 416*a-b* and 426*a-b* may then be provided to codecs 432*a-b* and 434*a-b* respectively as shown to generate compressed data streams 434*a-d*. In some aspects, one or more of the codecs 432*a-b* and 434*a-b* may be executed by video acceleration circuitry included in a device performing the data flow 400 (e.g. client device 110).

The compressed data streams 434*a-d* may be transmitted over the network 130. For example, the streams 434*a-d* may be transmitted from the mobile device 110 to the server 115. While FIG. 4A shows audio data 406*a* and video data 406*b* being processed by separate pipelines, in some aspects, one of skill in the art would understand that the audio data 406*a* and video data 406*b* could be processed by a single pipeline. For example, one filter 412 might be configured to process both audio and video data. Similarly, a difference calculator 422 may be configured to generate difference information for both audio and video data. While FIG. 4 shows that four compressed streams 434*a-d* may be generated by the data flow 400, in various aspects, two data streams may be generated. For example, in some aspects, two video streams may be generated, two audio streams may be generated, or two multimedia data streams including both video and audio data may be generated. Furthermore, while FIG. 4A shows separate low fidelity streams and difference streams (e.g. 416*a*/426*a* and 416*b*/426*b*), in some aspects, these streams may be physically combined. For example, streams 416*a* and 426*a* could be combined by interleaving the two streams or chunking the two streams.

Some aspects may combine a filter and difference calculation operation. For example, while FIG. 4A shows a filter 412*a* and separate difference calculator 422*a*, in some aspects, these two computations may be done in a combined manner, which may result in improved efficiencies. For example, data locality of the filtering and differencing operations may provide for improved cache and/or virtual memory hit rates when performing the filtering and difference computations in an integrated manner.

Figure 4B:
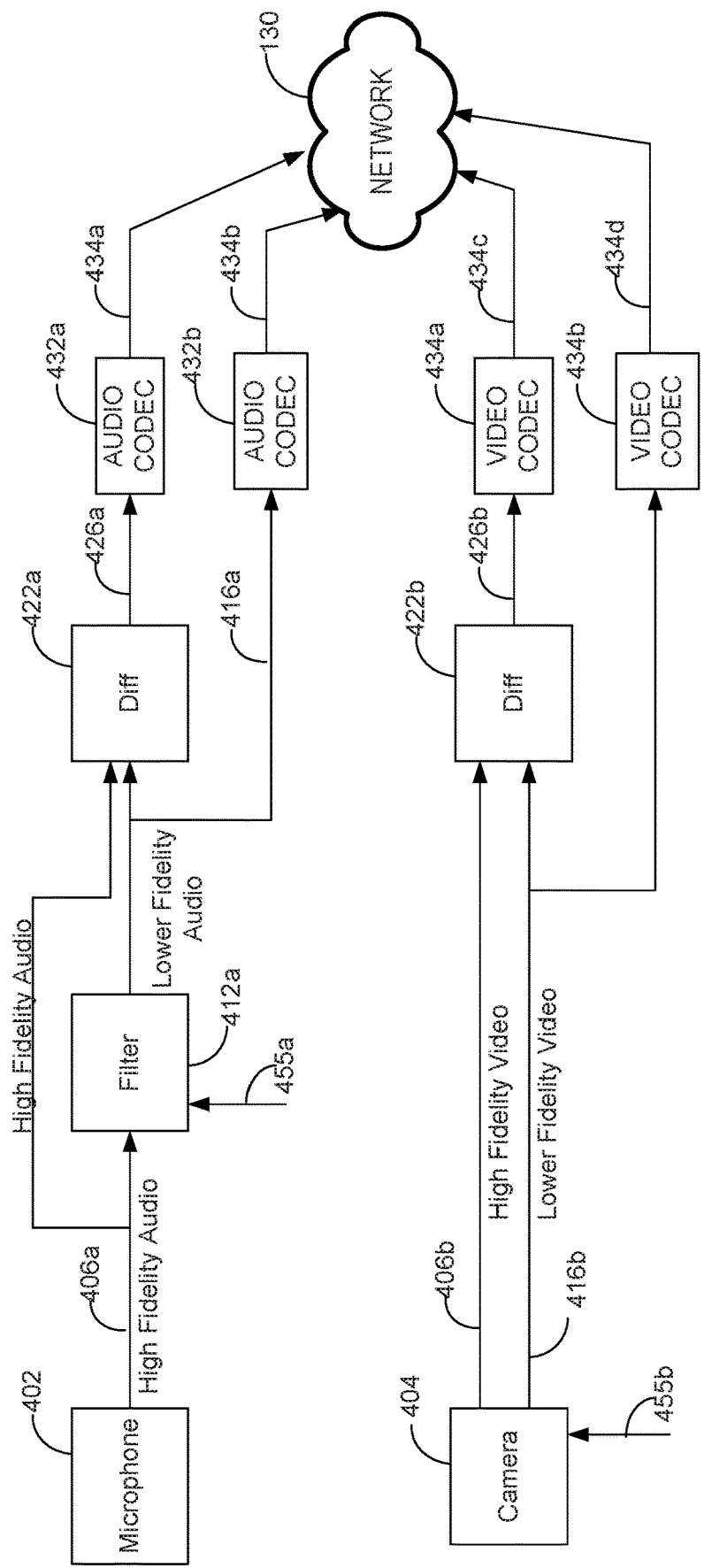
FIG. 4B is a data flow diagram that may be implemented in some of the disclosed embodiments.

FIG. 4B is a data flow diagram that may be implemented in some of the disclosed embodiments. FIG. 4B is similar to FIG. 4A, except that FIG. 4B shows that the camera 404 may be configured to output both the high-fidelity image 406*b* and the lower fidelity image stream 416*b*. In these aspects, there may not be a need to perform the filtering provided by block 412*b* shown in FIG. 4A. Instead, the low-fidelity video stream 416*b* may be obtained from the camera 404 as shown in FIG. 4B without a need for the filter 412*b* of FIG. 4A. In these aspects, the signal 455*b* to control the filtering in the embodiment of FIG. 4A may instead be provided to the camera 404, which may provide for configuration of an appropriate lower fidelity imaging sensor mode as needed. In some aspects, having the camera 404 or an imaging sensor included in the camera 404 provide both a high and lower fidelity image stream (406*b* and 416*b*) may provide for improved battery life. For example, the camera 404 may be able to provide the lower fidelity stream 416*b* more efficiently than the filter 412*b* of FIG. 4A. Processing time may also be improved in the implementations shown in FIG. 4B relative to those of FIG. 4A.

Figure 5:
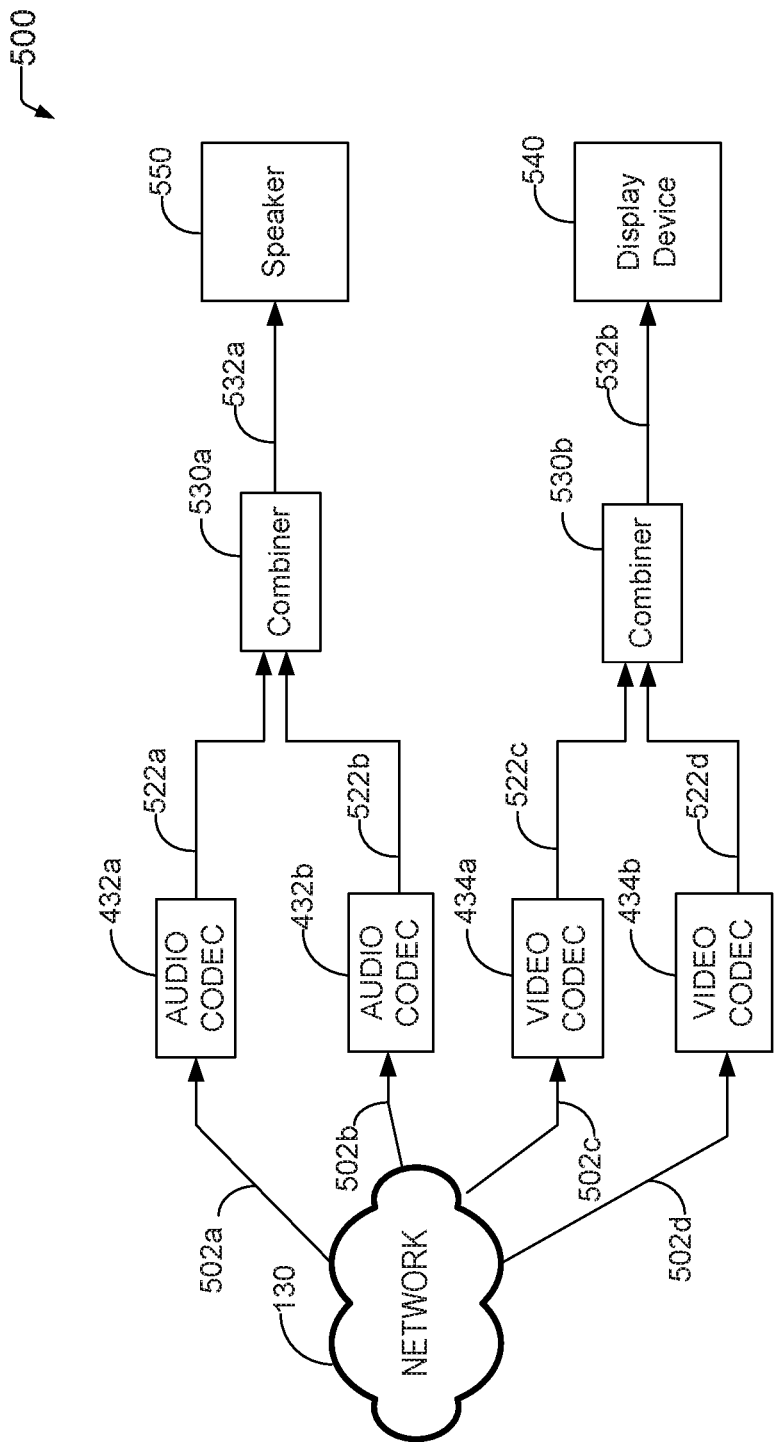
FIG. 5 is a data flow diagram that may be implemented in some of the disclosed embodiments.

FIG. 5 is a data flow diagram that may be implemented in some of the disclosed embodiments. For example, the data flow 500 may be implemented by the mobile device 120 and/or laptop device 130 in some embodiments. Data flow 500 shows reception of four data streams 502*a-d* from the network 130. The two streams 502*a* and 502*b* may represent audio data while the streams 502*c* and 502*d* may represent video data. In some aspects, a first stream of each type of data, for example, streams 502*a* and 502*c*, may represent a low-resolution/fidelity version of a higher quality stream captured from an imaging sensor and/or microphone. The other two streams (e.g. 502*b* and 502*d*), may represent difference streams. Each of the streams 502*a-d* may be provided to a codec, shown as codecs 432*a-b* and 432*c-d*. The codecs 432*a-b* and 432*c-d* may decompress the streams 502*a-d* into streams 522*a-d* respectively. In some aspects, codecs 432*a-b* may be the same codec, and/or codecs 432*c-d* may also be the same codec. In some aspects, a single codec may be used to decompress all of the streams 502*a-d* to generate streams 522*a-d*. The decompressed audio streams 522*a-b* are provided to a combiner 530*a*. The combiner 530*a* may generate a higher fidelity audio stream 532*a* from the two streams 522*a-b*. The combiner 530*b* may generate a higher fidelity video stream 532*b* from the two streams 522*c-d*. In some aspects, the combiner 530*b* may add corresponding pixel values in the streams 522*c-d* to generate the higher fidelity video stream 532*b*. In some aspects, one or more of the combiners 530*a-b* may be implemented via video acceleration circuitry included in a device performing the data flow 500 (e.g. viewing devices 120 and/or 130).

Figure 6:
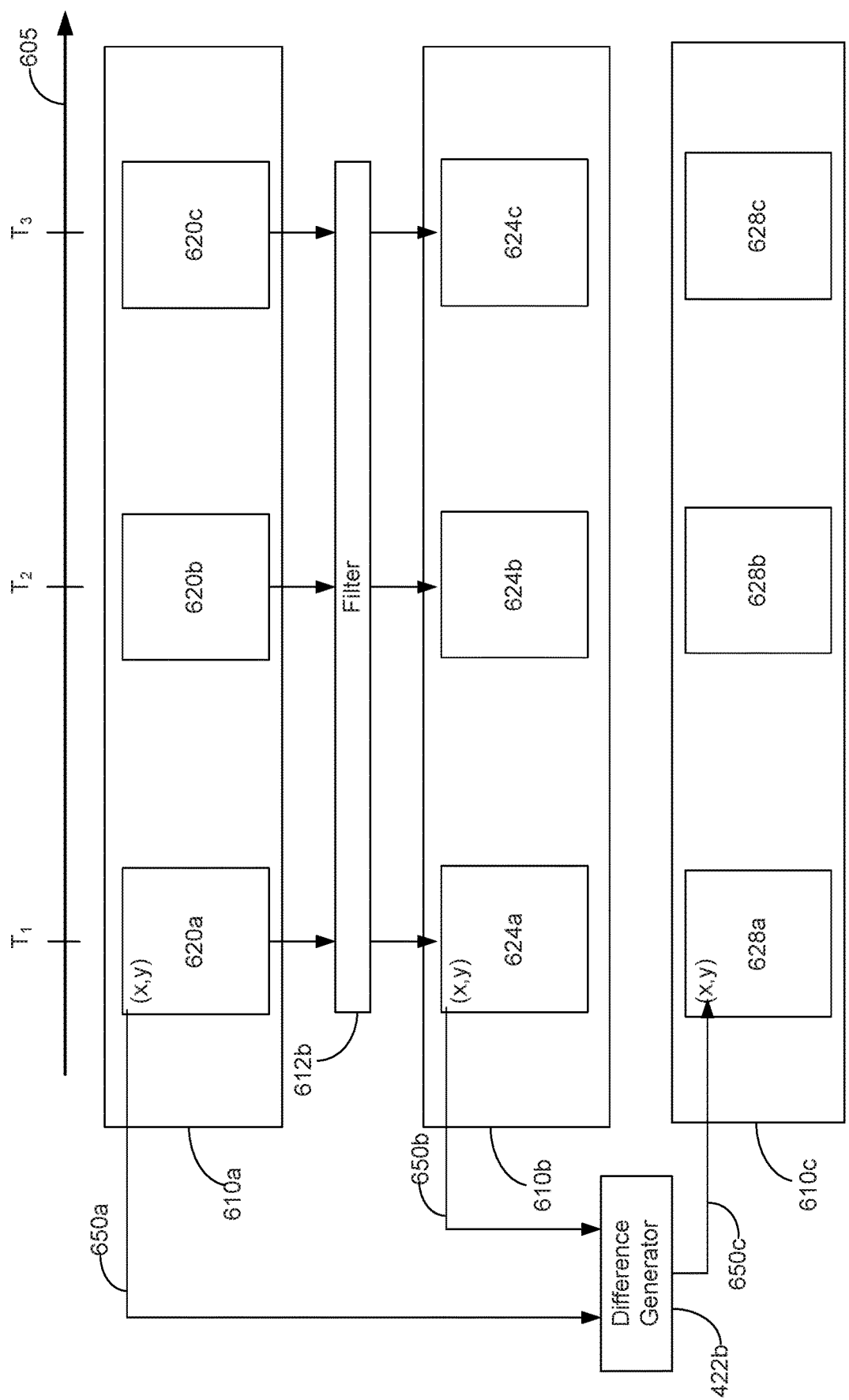
FIG. 6 is a data flow diagram that may be implemented in at least some of the disclosed embodiments.

FIG. 6 is a data flow diagram that may be implemented in at least some of the disclosed embodiments. The data flow 600 of FIG. 6 shows a timeline 605 including three points in time $T_1$, $T_2$, and $T_3$. Also shown in the data flow 600 is a first data stream 610*a*. The first multimedia data stream 610*a* includes at least three video frames 620*a-c*. Each of the three video frames 620*a-c* correspond within points of time $T_1$, $T_2$, and $T_3$ respectively. In other words, the video frames 620*a-c* are each to be displayed at one of the points of time $T_1$, $T_2$, and $T_3$.

The first data stream 610*a* is provided to a filter 612*b* to generate a second data stream 610*b*. For at least each of the three video frames 620*a-c* included in the first data stream 610*a*, a corresponding frame 624*a-c* respectively is generated in the second data stream 610*b*. Each of the frames 624*a-c* of the second data stream 610*b* may have a lower resolution and/or fidelity than its corresponding frame 620*a-c* respectively of the first data stream 610*a*.

A difference generator 422*b* receives, as input, pixel values from corresponding frames in the data streams 610*a* and 610*b* and generates a difference stream 610*c*. The difference stream 610c includes frames 628a-c that correspond in time (vertically in FIG. 6) with each of frames 624a-c and frames 620a-c respectively in each of the streams 610b and 610a. FIG. 6 shows the difference generator 422b receiving value 650a from frame 620a and value 650b from corresponding frame 624a. The difference generator 422b may determine a difference between the two values 650a and 650b and generate a difference value 650c. The values 650a and 650b used to generate a single difference value may be received from an equivalent location in each of the corresponding video frames 620a and 624a. An example location shown in FIG. 6 has a coordinate (x,y) in each of the corresponding frames 620a and 624a. The difference value 650c may be used to generate the difference stream 610c, and in particular, may be included in a frame that corresponds in time with frames in the streams 610a and 610b sourcing the values 650a and 650b respectively. While FIG. 6 shows the source locations of two values 650a-b from each of frames 620a and 624a respectively to a single resulting value 650c in the difference stream 610c, one of skill would understand that the difference process illustrated for a single pixel in FIG. 6 may be replicated for multiple corresponding pixels within each data stream, including up to all corresponding pixels in a pair of corresponding frames such as frames 620a and 624a.

Figure 7:
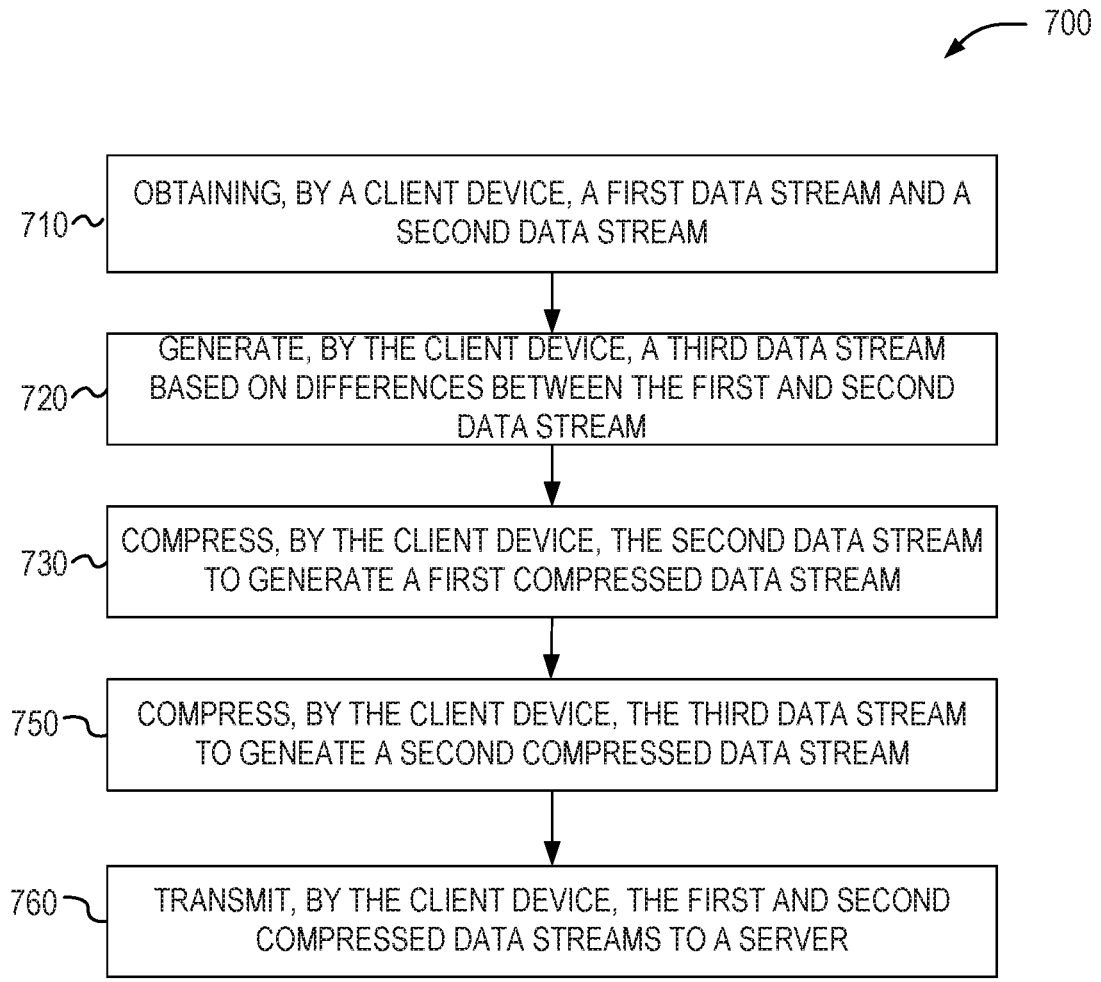
FIG. 7 is a flowchart of a method for encoding a data stream.

FIG. 7 is a flowchart of a method for encoding a data stream. In some aspects, the data stream encodes video data. In some aspects, the data stream encodes audio data. In some aspects the data stream may be a multimedia data stream. For example, the data stream may encode audio and video data. In some aspects, the process 700 discussed below with respect to FIG. 7 may be performed by the mobile device 110. For example, in some aspects, processing circuitry included in the mobile device 110 may be configured by instructions stored in an electronic memory of the mobile device 110 to perform one or more functions discussed below with respect to process 700.

In block 710, a first data stream (e.g. 406a and/or 406b) and a second data stream (e.g. 416a and/or 416b) are obtained by a client device (e.g. 110). In some aspects, the second data stream is obtained or generated by filtering the first data stream (e.g. 406a and/or 406b). The filtering of the first data stream may reduce its fidelity, resulting in the second data stream having a lower bandwidth requirement (size) than the first data stream, but otherwise representing images included in the first data stream. For example, in some aspects, filtering the first data stream may reduce one or more of its frame rate, resolution, color depth, or signal variation to provide for reduced encoding and/or compression sizes of the second data stream relative to the first data stream.

In some other aspects, the first and second data streams may each be obtained from an imaging sensor or camera (e.g. 404) included in the client device (e.g. 110). For example, an imaging sensor included in the client device may be configurable to generate two different fidelity data streams representing images captured by the imaging sensor. Thus, in some aspects, the second data stream may be a lower fidelity version of the first data stream.

In some aspects, block 710 includes capturing the first data stream from an input device or multiple input devices (e.g. 402 and/or 404). For example, if the first data stream is an audio data stream, it may be captured from a microphone (e.g. 402) included in the client device (e.g. 110). If the first data stream is a video data stream, it may be captured by a camera or imaging sensor (e.g. 404) included in the client device (e.g. 110). In some aspects, the client device may be a cell phone, laptop, desktop, internet of things device, or any computing device configured to communicate over a network and generate data. The first data stream may have a first fidelity level or resolution level. The second data stream generated in block 710 may have a lower fidelity and/or resolution level, such that the second data stream consumes less space than the first data stream. For example, a portion of the first data stream representing a period of time is larger than a portion of the second data stream representing the same period of time. In some aspects, the filtering may apply a low motion blur filter (e.g. a median blur filter) to the first data stream to generate the second data stream. In other aspects, other filters may be applied to the first data stream to generate the second data stream. In some aspects, block 710 may be accomplished via use of a video encoding accelerator included in the client device.

In some aspects, block 710 includes receiving a message indicating a selection of a filter from a server. For example, in some aspects, the server 115 may transmit a filter configuration message (e.g. 202) to the mobile device 110 indicating a type of filter (e.g. 412a or 412b) to apply to data captured or generated by the mobile device 110. In some aspects, this message may include one or more of the fields of either filter configuration message portion 300 or portion 350, discussed above with respect to FIG. 3. Using this mechanism, the server may be able to vary the level of fidelity of a lower fidelity version of content transmitted by the mobile device by configuring the filter on the mobile device in this manner. Block 710 may then apply the selected filter to the first data stream when generating the second data stream as described above.

In block 720, a third data stream is generated by the client device. The third data stream is generated based on differences between the first and second data streams. For example, if the first and second data streams encode video data, the third data stream may be generated by determining pixel by pixel differences between the first and second data streams. The pixel differences may be organized into the third data stream. An example implementation of the difference determination of 720 is illustrated as part of data flow 600, discussed above with respect to FIG. 6.

In block 730, the client device compresses the second data stream to generate a first compressed data stream. In some aspects, the second data stream may be compressed using a H.264 codec, or at least be compressed into a H.264 format. Other compression techniques are/or other formats are contemplated. For example, the disclosed embodiments may generalize to most current standard DCT based video compression formats with little or no modification (e.g. H.264, H.265, Video Compression Format VP8, Video Compression Format VP9). The disclosed techniques may also be applied when using other compression technologies.

In block 750, the client device compresses the third data stream to generate a second compressed data stream. In some aspects, the third data stream may be compressed using a H.264 codec, or at least be compressed into an H.264 format. Other compression techniques and/or other formats are contemplated.

In block 760, the client device transmits the first and second compressed data streams to a server. In some aspects, the first and second compressed data streams may be transmitted contemporaneously to the server. For example, data of the first and second compressed data streams may be interleaved in time during the transmission to the server. In other aspects, the second compressed data stream may be transmitted at a time after the transmission of the first data stream. For example, in some aspects, network conditions may provide for restricted amounts of bandwidth, such that only the first compressed data stream is transmitted while these conditions are present. After the network conditions improve, the second compressed data stream may be transmitted in some aspects.

In some aspects, the server may be the server 115, discussed above with respect to FIG. 1. In some aspects, the server may be a virtual server. For example, in some cloud based implementations, processing capability available via a particular destination Internet Protocol address may be provided via various hardware components. Thus, the server referred to here may not be a single unvarying piece of physical hardware in some aspects, but may represent a virtual server that provides processing capability for messages transmitted to a particular destination (i.e. server) address.

As described above, process 700 generates a single difference stream (e.g. the third data stream) and a single lower fidelity stream (e.g. the second data stream). In some aspects, multiple difference streams may be generated. For example, while the first data stream is described above as being captured from a device such as a camera or microphone, in some aspects, the first data stream is instead itself a product of second filtering a fourth data stream. The fourth data stream may also encode one or more of audio data and video data. This second filtering may be different than the filtering described above in the context of block 710. In some aspects, the specific type of filtering to be performed as part of this second filtering is indicated in the filter configuration message (e. g 202), also discussed above with respect to block 710. In these aspects, process 700 may also include generating a fifth data stream based on differences between the fourth data stream and the first multimedia data stream. These differences may also be determined in a similar manner as that described above with respect to FIG. 6. This fifth data stream may also be compressed (e.g. via an H.264 codec in some aspects), and the third compressed data stream may also be transmitted to the server in these aspects. In these aspects, instead of the first data stream being captured via an imaging sensor or microphone, the fourth data stream may be the one captured.

The disclosed embodiments contemplate an unlimited number of difference streams being generated in various aspects. As the number of difference streams increases, more processing power may be needed to create the difference streams and also to regenerate the higher fidelity versions of the data stream on viewing device(s). Thus, there represents a design tradeoff between granularity of size selection of multimedia data streams, and processing overhead.

Figure 8:
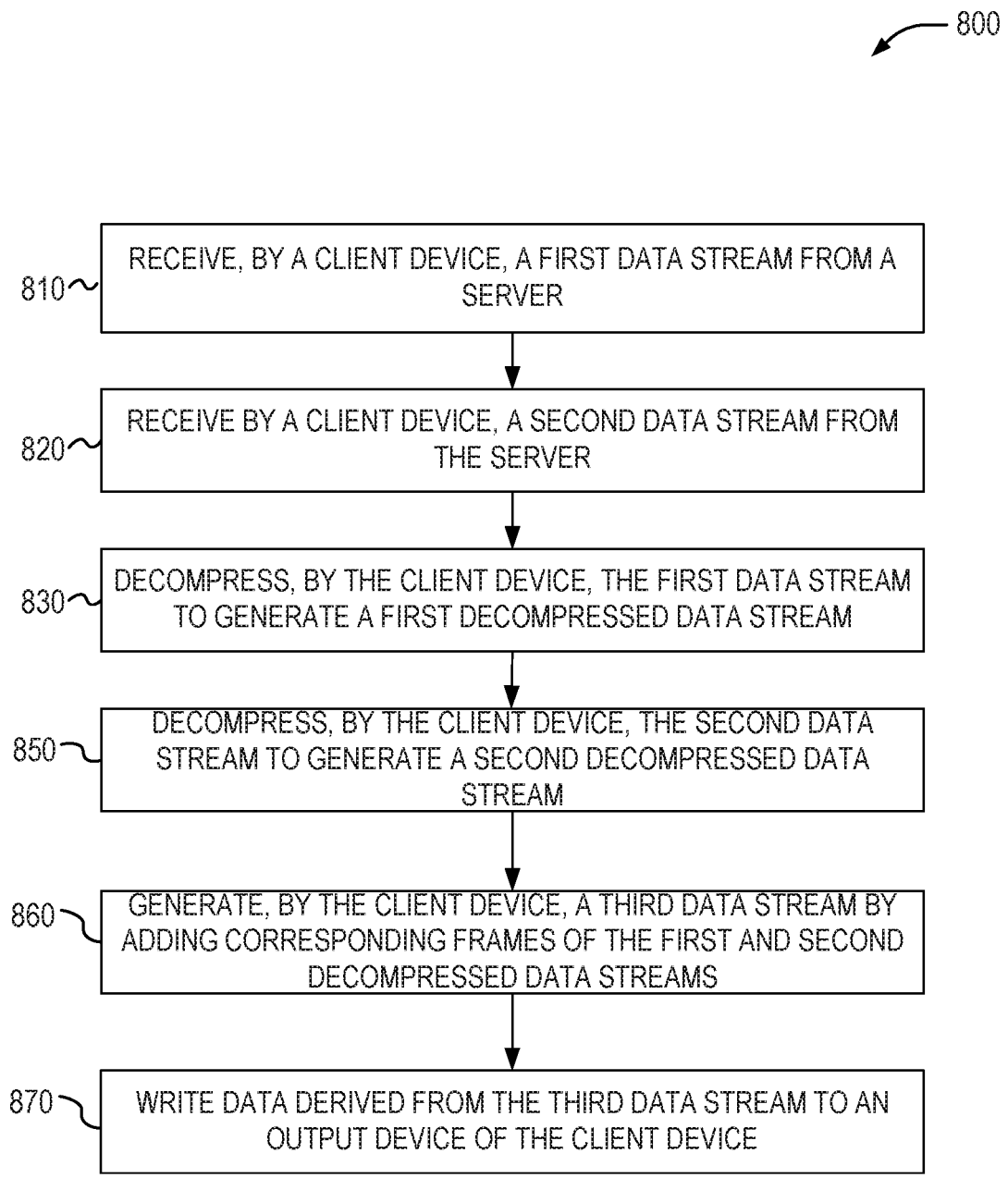
FIG. 8 is a flowchart of an example method for decoding a data stream.

FIG. 8 is a flowchart of an example method for decoding a data stream. In some aspects, the data stream encodes video data. In some aspects, the data stream encodes audio data. In some aspects, the data stream encodes multimedia data. For example, in some aspects, the data stream encodes both video and audio data. In some aspects, the process 800 discussed below with respect to FIG. 8 may be performed by a viewing device, such as any one or more of viewing devices 120 and/or 130, discussed above with respect to FIG. 1. In some aspects, process 800 may be performed by processing circuitry included in a viewing device. In some aspects, instructions that configure the processing circuitry to perform one or more of the functions discussed below with respect to process 800 may be stored in an electronic memory of the viewing device. Furthermore, while in some aspects, a result of the process 800 is that video data is viewed on the viewing device, in some aspects, decoding of the data stream may not result in viewing of video data. For example, if the data stream encodes audio data but does not encode video data, no viewing may result from the decoding. Instead, in some aspects, the decoded data may be provided to a speaker or other audio output device.

While the discussion below may refer to a server, one of skill in the art would understand that a server may not represent, in some aspects, a single physical device. For example, virtual servers are becoming common, and may be implemented via a pool of computing resources may be used to service network requests to a particular destination address or service name. Thus, references to server throughout this disclosure, may, in some aspects, refer to a single physical computing device, while in other aspects may include virtual servers that may encompass one or more computing devices that may change over time.

In block 810, a first data stream is received from a server by a client device. In some aspects, the first data stream may include data having a first fidelity or fidelity. In some aspects, the first data stream may encode one or more of audio data and video data.

In block 820, a second data stream is received by the client device. The second data stream may be received from a server in some aspects. In some aspects, the second data stream may be a difference stream, such as difference stream 426a or 426b, or both, discussed above with respect to FIGS. 4A-B.

In block 830, the first data stream is decompressed to generate a first decompressed data stream. In some aspects, the first data stream may be in an H.264 format. In some aspects, the decompression of block 830 may be performed by a H.264 codec.

In block 850, the client device decompresses the second data stream to generate a second decompressed data stream. In some aspects, the second data stream may be in an H.264 format. In some aspects, the decompression of block 850 may be performed by a H.264 codec.

In block 860, a third data stream is generated by the client device. The third data stream may be generated by adding corresponding frames of the first decompressed data stream and the second decompressed data stream. For example, as illustrated in FIG. 6, low-fidelity frames and difference stream frames that correspond in time may be added to generate higher fidelity frames. In some aspects, frames included in the third data stream may be generated by adding pixel values (or color values included in a pixel) having equivalent coordinate values in each of the first decompressed data stream and second decompressed data streams to generate a pixel value (or color value) at the same coordinate value in the frame of the third data stream. In some aspects, each pixel may include three color values. For example, a first color value for red, a second color value for green, and a third color value for blue (e.g. RGB). In some aspects, corresponding red, green, and blue color values corresponding in time and having equivalent positions within the first and second decompressed data streams may be added to generate corresponding RGB color values for a corresponding pixel in a frame in the third data stream. In some aspects, each of the color values may be added using Equation 1 below:

$$\text{High} = \text{Min}(2*(\text{Delta} - \text{trunc}(\text{MAX VALUE}/2)) + \text{Low}, \text{MAX VALUE}) \quad (1)$$

Where:
High is the resulting color value for a frame of the third data stream
Delta is a color value from a difference stream (e.g. second uncompressed data stream).

Low is a color value from the first uncompressed data stream (e.g. a lower fidelity stream), where delta and low correspond in time and are from equivalent coordinates of corresponding frames in the first and second uncompressed data streams.

Trunc is a well-known truncation function that eliminates fractional components.

MAX VALUE is a maximum value of the computed value in high. For example, if each rgb color value is eight (8) bits, MAX VALUE may be 255.

In some aspects, the third data stream may be generated using transformations in the YUV space. For simplicity, the above example is provided in RGB, with one byte per channel, 24 bits per pixel.

In block 870, data derived from the third data stream is written to an output device of the client device. In some aspects, if the third data stream includes audio data, the data derived from the third data stream may be written to an audio device, such as a speaker. In some aspects, if the third data stream includes video data, the data derived from the third data stream may be displayed on an electronic display of the client device, such as a display of the mobile device 120 or the laptop 130.

While process 800 is discussed above as being performed by a client device, such as any of viewing devices 120 or 130 discussed above, in some aspects, process 800 may be performed by the server 115. In these aspects, block 870 may write the data derived from the third data stream to a network. For example, block 870 may transmit the data derived from the third data stream to a viewing device, such as the client devices 120 and/or 130 in these aspects.

While process 800 is discussed above as combining a single difference stream (e.g. second uncompressed data stream) with another data stream (e.g. a low-fidelity stream, e.g. the first uncompressed data stream) to generate a third data stream (e.g. a higher fidelity stream), in some aspects, multiple difference streams may be received from the server. In these aspects, a first difference stream (e.g. second uncompressed data stream) may be combined with another data stream (e.g. first uncompressed data stream). An additional difference stream may then be applied to the resulting stream (e.g. third data stream) to generate a fourth data stream. The first, third, and fourth data streams may then represent a varying fidelity of content. In some aspects, a third difference stream may also be received from the server, and applied to the fourth data stream, resulting in a fifth data stream. In these aspects, each of the first, third, fourth, and fifth data streams represent varying fidelity/resolution versions of content.

In some aspects, process 800 may include indicating to a server providing data streams to a device executing process 800 (e.g. 120 or 130), a type of stream to provide to the executing device. For example, a viewing device may send a message to the server indicating one or more of a fidelity, encoding rate, and/or an audio fidelity requested by the viewing device. In some aspects, the viewing device may provide information on one or more characteristics of the viewing device and/or the network connection between the viewing device and the server to the server. For example, the viewing device may, in some aspects, measure network performance between the server and the viewing device, and request a data stream based on the measured performance. Alternatively, the viewing device may provide these characteristics to the server, and the server will select an appropriate data stream to provide to the viewing device based on the characteristics. For example, if the viewing device has a relatively small screen, this may be indicated to the server by the viewing device. The server may then provide a version of a data stream appropriate for the screen size indicated by the viewing device. In some cases, the viewing device may receive the lower fidelity data stream (e.g. first data stream) and no difference stream, if the screen size is below a threshold size for example. In this case, blocks 820 850 and 860 may not be performed.

Figure 9:
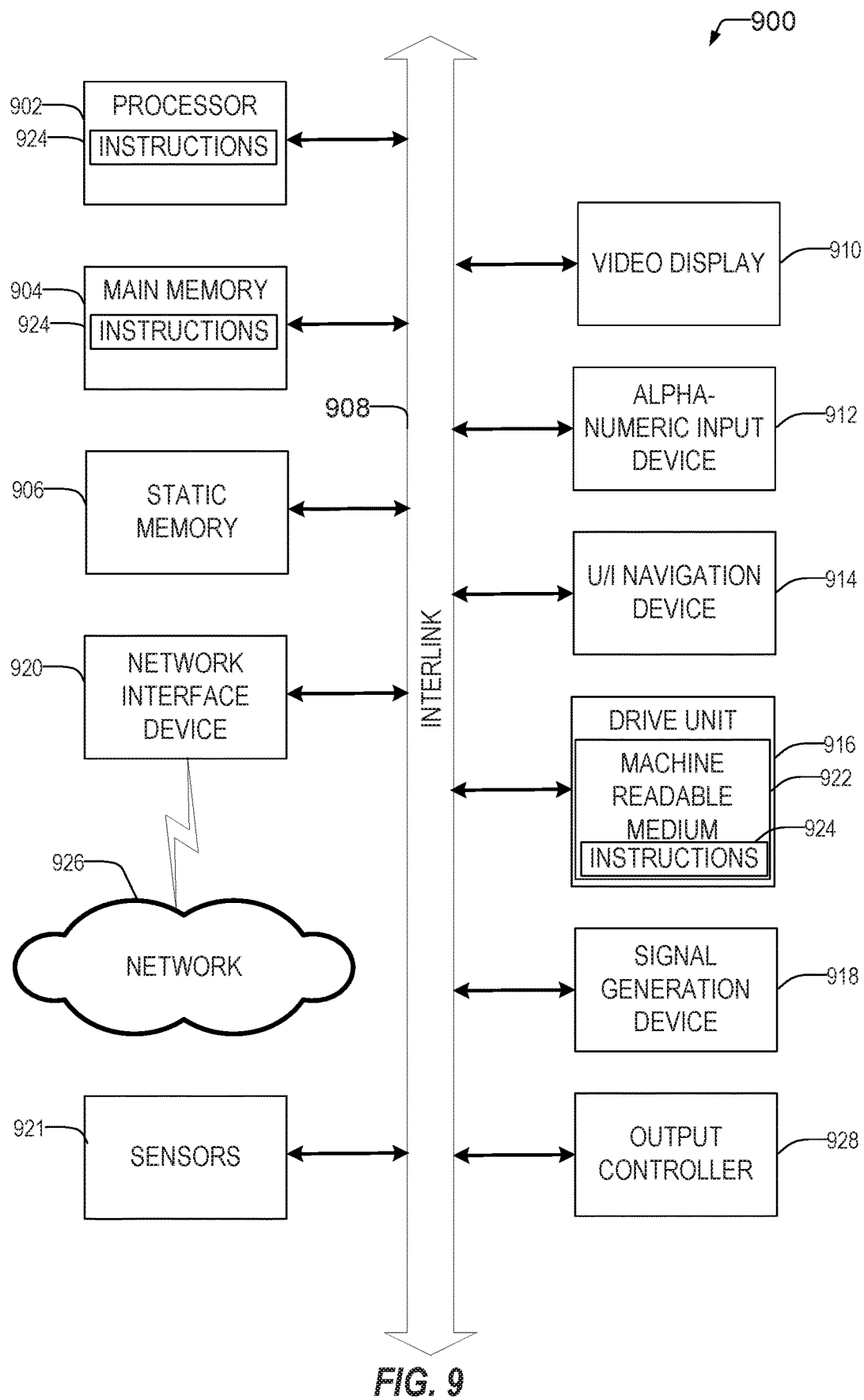
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 900 may implement, in whole or in part, the any one of the mobile device 110 or 120, laptop 130, and server 115. In various embodiments, machine 900 may perform one or more of the processes described above with respect to FIG. 7 or 8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method for encoding data at a client device, the client device in communication with a server, comprising: obtaining, by the client device, a first multimedia data stream and a second multimedia data stream, the second multimedia data stream being a lower fidelity version of the first multimedia data stream; generating, by the client device, a third multimedia data stream based on differences between the first and second multimedia data streams; compressing, by the client device, the second multimedia data stream to generate a first compressed multimedia data stream; compressing, by the client device, the third multimedia data stream to generate a second compressed multimedia data stream; and transmitting, by the client device, the first and second compressed multimedia data steams to the server.

In Example 2, the subject matter of Example 1 optionally includes generating, by the client device, the first data stream by capturing a live video via an imaging sensor of the client device.

In Example 3, the subject matter of any one or more of Examples 1-2 optionally include wherein the multimedia data stream includes video data.

In Example 4, the subject matter of Example 3 optionally includes wherein the generation of the third multimedia data stream is based on pixel by pixel differences between the video data of the first and second multimedia data streams.

In Example 5, the subject matter of any one or more of Examples 3-4 optionally include wherein the multimedia data stream includes audio data.

In Example 6, the subject matter of any one or more of Examples 1-5 optionally include obtaining a fourth multimedia data stream with a second filter to generate the first multimedia data stream; generating a fifth multimedia data stream based on differences between the fourth multimedia data stream and the first multimedia data stream; compressing the fifth multimedia data stream to generate a third compressed multimedia data stream; and transmitting the third compressed multimedia data stream to the server.

In Example 7, the subject matter of Example 6 optionally includes generating, by the client device, the fourth multimedia data stream by capturing a live video from an imaging sensor of the client device.

In Example 8, the subject matter of any one or more of Examples 4-7 optionally include wherein the generation of the third multimedia data stream comprises determining pixel by pixel differences between a first frame of the first multimedia data stream and a corresponding second frame of the second multimedia data stream to generate a corresponding third frame of the third multimedia data stream.

In Example 9, the subject matter of Example 8 optionally includes wherein the first, second, and third frames correspond in time within the multimedia data streams.

In Example 10, the subject matter of any one or more of Examples 1-9 optionally include wherein the transmission of the first and second compressed multimedia data streams comprises transmitting data corresponding to the second and third frames contemporaneously.

In Example 11, the subject matter of any one or more of Examples 1-10 optionally include generating the first compressed multimedia data stream in an H.264 format.

In Example 12, the subject matter of any one or more of Examples 2-11 optionally include receiving a message from the server indicating a filter, selecting a low motion blur filter in response to the indication, and filtering the first multimedia data stream using the selected filter in response to the message to generate the second multimedia data stream.

Example 13 is a client device to encode data, the client device in communication with a server, the apparatus comprising: processing circuitry; a hardware memory storing instructions that when executed cause the processing circuitry to perform operations to encode the data, the operations comprising: obtaining a first multimedia data stream and a second multimedia data stream, the second multimedia data stream being a lower fidelity version of the first multimedia data stream, generating a third multimedia data stream based on differences between the first and second multimedia data streams, compressing the second multimedia data stream to generate a first compressed multimedia data stream, compressing the third multimedia data stream to generate a second compressed multimedia data stream, and transmitting the first and second compressed multimedia data steams to the server.

In Example 14, the subject matter of Example 13 optionally includes the operations further comprising generating, by the client device, the first data stream by capturing a live video via an imaging sensor of the client device.

In Example 15, the subject matter of any one or more of Examples 13-14 optionally include wherein the multimedia data stream includes video data.

In Example 16, the subject matter of Example 15 optionally includes wherein the generation of the third multimedia data stream is based on pixel by pixel differences between the video data of the first and second multimedia data streams.

In Example 17, the subject matter of any one or more of Examples 15-16 optionally include wherein the multimedia data stream includes audio data.

In Example 18, the subject matter of any one or more of Examples 13-17 optionally include the operations further comprising: filtering a fourth multimedia data stream with a second filter to generate the first multimedia data stream; generating a fifth multimedia data stream based on differences between the fourth multimedia data stream and the first multimedia data stream; compressing the fifth multimedia data stream to generate a third compressed multimedia data stream; and transmitting the third compressed multimedia data stream to the server.

In Example 19, the subject matter of Example 18 optionally includes the operations further comprising generating the fourth multimedia data stream by capturing a live video from an imaging sensor of the client device.

In Example 20, the subject matter of any one or more of Examples 16-19 optionally include wherein the generation of the third multimedia data stream comprises determining pixel by pixel differences between a first frame of the first multimedia data stream and a corresponding second frame of the second multimedia data stream to generate a corresponding third frame of the third multimedia data stream.

In Example 21, the subject matter of Example 20 optionally includes wherein the first, second, and third frames correspond in time within the multimedia data streams.

In Example 22, the subject matter of any one or more of Examples 13-21 optionally include wherein the transmission of the first and second compressed multimedia data streams comprises transmitting data corresponding to the second and third frames contemporaneously.

In Example 23, the subject matter of any one or more of Examples 13-22 optionally include generating the first compressed multimedia data stream in a H.264 format.

In Example 24, the subject matter of any one or more of Examples 14-23 optionally include the operations the operations further comprising receiving a message from the server indicating a filter, selecting a low motion blur filter in response to the indication, and filtering the first multimedia data stream using the low motion blur filter in response to the message.

Example 25 is a non-transitory computer readable storage medium comprising instructions that when executed cause processing circuitry to perform operations to encode data at a client device, the client device in communication with a server, the operations comprising: obtaining, by the client device, a first multimedia data stream and a second multimedia data stream, the second multimedia data stream being a lower fidelity version of the first multimedia data stream; generating, by the client device, a third multimedia data stream based on differences between the first and second multimedia data streams; compressing, by the client device, the second multimedia data stream to generate a first compressed multimedia data stream; compressing, by the client device, the third multimedia data stream to generate a second compressed multimedia data stream; and transmitting, by the client device, the first and second compressed multimedia data steams to the server.

In Example 26, the subject matter of any one or more of Examples 13-25 optionally include the operations further comprising generating, by the client device, the first data stream by capturing a live video via an imaging sensor of the client device.

In Example 27, the subject matter of any one or more of Examples 13-26 optionally include wherein the multimedia data stream includes video data.

In Example 28, the subject matter of any one or more of Examples 15-27 optionally include wherein the generation of the third multimedia data stream is based on pixel by pixel differences between the video data of the first and second multimedia data streams.

In Example 29, the subject matter of any one or more of Examples 15-28 optionally include wherein the multimedia data stream includes audio data.

In Example 30, the subject matter of any one or more of Examples 13-29 optionally include the operations further comprising: filtering a fourth multimedia data stream with a second filter to generate the first multimedia data stream; generating a fifth multimedia data stream based on differences between the fourth multimedia data stream and the first multimedia data stream; compressing the fifth multimedia data stream to generate a third compressed multimedia data stream; and transmitting the third compressed multimedia data stream to the server.

In Example 31, the subject matter of any one or more of Examples 18-30 optionally include the operations further comprising generating, by the client device, the fourth multimedia data stream by capturing a live video from an imaging sensor of the client device.

In Example 32, the subject matter of any one or more of Examples 16-31 optionally include wherein the generation of the third multimedia data stream comprises determining pixel by pixel differences between a first frame of the first multimedia data stream and a corresponding second frame of the second multimedia data stream to generate a corresponding third frame of the third multimedia data stream.

In Example 33, the subject matter of any one or more of Examples 20-32 optionally include wherein the first, second, and third frames correspond in time within the multimedia data streams.

In Example 34, the subject matter of any one or more of Examples 13-33 optionally include wherein the transmission of the first and second compressed multimedia data streams comprises transmitting data corresponding to the second and third frames contemporaneously.

In Example 35, the subject matter of any one or more of Examples 13-34 optionally include generating the first compressed multimedia data stream in a H.264 format.

In Example 36, the subject matter of any one or more of Examples 14-35 optionally include the operations further comprising receiving a message from the server indicating a filter, selecting a low motion blur filter in response to the indication, and filtering the first multimedia data stream with the low motion blur filter in response to the message.

Example 37 is a method for decoding video, comprising: receiving, by a client device, a first multimedia data stream from a server; receiving, by the client device, a second multimedia data stream from the server; decompressing, by the client device, the first multimedia data stream to generate a first decompressed multimedia data stream; decompressing, by the client device, the second multimedia data stream to generate a second decompressed multimedia data stream; generating, by the client device, a third multimedia data stream by adding corresponding frames of the first and second decompressed multimedia data streams; and displaying, by the client device, the third multimedia data steam on a display of the client device.

In Example 38, the subject matter of any one or more of Examples 13-37 optionally include wherein the generation of the third multimedia data stream comprises adding a first pixel value of a first frame in the first decompressed multimedia data steam to a corresponding second pixel value in a corresponding second frame of the second decompressed multimedia data stream to generate a corresponding third pixel value in a corresponding third frame of the third multimedia data stream.

In Example 39, the subject matter of any one or more of Examples 14-38 optionally include adding the first pixel value and the second pixel value according to min (2*(second pixel value−trunc(MAX VALUE/2))+first pixel value, MAX VALUE to generate the third pixel value.

In Example 40, the subject matter of any one or more of Examples 15-39 optionally include the MAX VALUE being equivalent to 255.

In Example 41, the subject matter of any one or more of Examples 14-40 optionally include wherein the first, second, and third frames correspond in time within the multimedia data streams.

In Example 42, the subject matter of any one or more of Examples 13-41 optionally include decompressing the first multimedia data stream from H.264 format.

Example 43 is an apparatus for decoding a multimedia data stream, comprising: processing circuitry, and an electronic hardware memory storing instructions that when executed by the processing circuitry cause the processing circuitry to perform operations comprising: receiving, by a client device, a first multimedia data stream from a server; receiving, by the client device, a second multimedia data stream from the server; decompressing, by the client device, the first multimedia data stream to generate a first decompressed multimedia data stream; decompressing, by the client device, the second multimedia data stream to generate a second decompressed multimedia data stream; generating, by the client device, a third multimedia data stream by adding corresponding frames of the first and second decompressed multimedia data streams; and displaying, by the client device, the third multimedia data steam on a display of the client device.

In Example 44, the subject matter of any one or more of Examples 19-43 optionally include wherein the generation of the third multimedia data stream comprises adding a first pixel value of a first frame in the first decompressed multimedia data steam to a corresponding second pixel value in a corresponding second frame of the second decompressed multimedia data stream to generate a corresponding third pixel value in a corresponding third frame of the third multimedia data stream.

In Example 45, the subject matter of any one or more of Examples 20-44 optionally include adding the first and second pixel values according to min (2*(second pixel value−trunc(MAX VALUE/2))+first pixel value, MAX VALUE) to generate the third pixel value.

In Example 46, the subject matter of any one or more of Examples 21-45 optionally include a MAX VALUE that is equivalent to 255.

In Example 47, the subject matter of any one or more of Examples 20-46 optionally include wherein the first, second, and third frames correspond in time within the multimedia data streams.

In Example 48, the subject matter of any one or more of Examples 19-47 optionally include decompressing the first multimedia data stream from a H.264 format.

Example 49 is a non-transitory computer readable storage medium comprising instructions that when executed, cause processing circuitry to perform operations to decode a multimedia data stream, the operations comprising: receiving, by a client device, a first multimedia data stream from a server; receiving, by the client device, a second multimedia data stream from the server; decompressing, by the client device, the first multimedia data stream to generate a first decompressed multimedia data stream; decompressing, by the client device, the second multimedia data stream to generate a second decompressed multimedia data stream; generating, by the client device, a third multimedia data stream by adding corresponding frames of the first and second decompressed multimedia data streams; and displaying, by the client device, the third multimedia data steam on a display of the client device.

In Example 50, the subject matter of any one or more of Examples 19-49 optionally include wherein the generation of the third multimedia data stream comprises adding a first pixel value of a first frame in the first decompressed multimedia data steam to a corresponding second pixel value in a corresponding second frame of the second decompressed multimedia data stream to generate a corresponding third pixel value in a corresponding third frame of the third multimedia data stream.

In Example 51, the subject matter of any one or more of Examples 20-50 optionally include adding the first and second pixel values according to min (2*(second pixel value−trunc(MAX VALUE/2))+first pixel value, MAX VALUE) to generate the third pixel value.

In Example 52, the subject matter of any one or more of Examples 21-51 optionally include a MAX VALUE of 255.

In Example 53, the subject matter of any one or more of Examples 20-52 optionally include wherein the first, second, and third frames correspond in time within the multimedia data streams.

In Example 54, the subject matter of any one or more of Examples 19-53 optionally include decompressing the first multimedia data stream from a H.264 format.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A client device for encoding data for transmission to a server, the client device comprising:
   hardware processing circuitry; and
   a hardware memory storing instructions that when executed configure the hardware processing circuitry to perform operations to encode the data, the operations comprising:
      obtaining a first multimedia data stream, the first multimedia data stream captured by a camera of the client device;
      receiving a message from the server indicating a filter;
      selecting a low motion blur filter in response to the indication,
      obtaining, based on the low motion blur filter, a second multimedia data stream, the second multimedia data stream being a lower fidelity version of the first multimedia data stream;
      generating a third multimedia data stream based on differences between the first and second multimedia data streams;
      compressing the second multimedia data stream to generate a first compressed multimedia data stream;
      compressing the third multimedia data stream to generate a second compressed multimedia data stream; and
      transmitting the first and second compressed multimedia data steams to the server.

2. The client device of claim 1, the operations further comprising:
   capturing a live video via the camera of the client device; and
   generating the first multimedia data stream based on the live video.

3. The client device of claim 1, wherein the second multimedia data stream is obtained from the camera.

4. The client device of claim 3, wherein the first multimedia data stream is a high fidelity multimedia data stream, the operations further comprising dropping the high fidelity data stream by the client device, the dropping including not communicating the high fidelity data stream to the server.

5. The client device of claim 1, wherein the multimedia data stream includes video data or audio data.

6. The client device of claim 5, wherein the generation of the third multimedia data stream is based on pixel by pixel differences between video data of the first and second multimedia data streams.

7. The client device of claim 6, wherein the generation of the third multimedia data stream comprises determining pixel by pixel differences between a first frame of the first multimedia data stream and a corresponding second frame of the second multimedia data stream to generate a corresponding third frame of the third multimedia data stream.

8. The client device of claim 7, wherein the first, second, and third frames correspond in time within the multimedia data streams.

9. The client device of claim 7, wherein the transmission of the first and second compressed multimedia data streams comprises transmitting data corresponding to the second and third frames contemporaneously.

10. The client device of claim 1, the operations further comprising:
    filtering a fourth multimedia data stream to generate the first multimedia data stream;
    generating a fifth multimedia data stream based on differences between the fourth multimedia data stream and the first multimedia data stream;

compressing the fifth multimedia data stream to generate a third compressed multimedia data stream; and transmitting the third compressed multimedia data stream to the server.

11. The client device of claim 10, the operations further comprising generating, by the client device, the fourth multimedia data stream by capturing a live video from the camera.

12. The client device of claim 1, wherein the first compressed multimedia data stream is generated as one of H.264 format, H.265 format, Video Compression Format VP8, or Video Compression Format VP9.

13. The client device of claim 1, wherein the server is configured to distribute data derived from the first compressed multimedia data stream to a second client device and to selectively distribute data derived from the second compressed multimedia data stream to the second client device based on a throughput available between the server and the second client device.

14. The client device of claim 1, wherein the selecting of the low motion blur filter comprises providing a filtering indication to the camera based on the filter indicated in the message, wherein the second multimedia data stream is obtained from the camera.

15. A method for encoding data at a client device for transmission to a server, comprising:
    obtaining, by the client device, a first multimedia data stream, the first multimedia data stream captured by a camera of the client device;
    receiving, by the client device, a message from the server indicating a filter;
    selecting, by the client device, a low motion blur filter in response to the indication,
    obtaining, by the client device and based on the low motion blur filter, a second multimedia data stream, the second multimedia data stream being a lower fidelity version of the first multimedia data stream;
    generating, by the client device, a third multimedia data stream based on differences between the first and second multimedia data streams;
    compressing, by the client device, the second multimedia data stream to generate a first compressed multimedia data stream;
    compressing, by the client device, the third multimedia data stream to generate a second compressed multimedia data stream; and
    transmitting, by the client device, the first and second compressed multimedia data steams to the server.

16. The method of claim 15, wherein the second multimedia data stream is obtained from a camera of the client device.

17. The method of claim 15, wherein the multimedia data stream includes video data, and wherein the generation of the third multimedia data stream is based on pixel by pixel differences between the video data of the first and second multimedia data streams.

18. The method of claim 15, further comprising:
    filtering a fourth multimedia data stream to generate the first multimedia data stream;
    generating a fifth multimedia data stream based on differences between the fourth multimedia data stream and the first multimedia data stream;
    compressing the fifth multimedia data stream to generate a third compressed multimedia data stream; and
    transmitting the third compressed multimedia data stream to the server.

19. The method of claim 15, wherein the server is configured to distribute data derived from the first compressed multimedia data stream to a second client device and to selectively distribute data derived from the second compressed multimedia data stream to the second client device based on a throughput available between the server and the second client device.

20. A non-transitory computer readable storage medium comprising instructions that when executed configure hardware processing circuitry to perform operations for encoding data at a client device for transmission to a server, the operations comprising:
    obtaining, by the client device, a first multimedia data stream, the first multimedia data stream captured by a camera of the client device;
    receiving, by the client device, a message from the server indicating a filter;
    selecting, by the client device, a low motion blur filter in response to the indication,
    obtaining, by the client device, and based on the low motion blur filter, a second multimedia data stream, the second multimedia data stream being a lower fidelity version of the first multimedia data stream;
    generating, by the client device, a third multimedia data stream based on differences between the first and second multimedia data streams;
    compressing, by the client device, the second multimedia data stream to generate a first compressed multimedia data stream;
    compressing, by the client device, the third multimedia data stream to generate a second compressed multimedia data stream; and
    transmitting, by the client device, the first and second compressed multimedia data steams to the server.

21. The non-transitory computer readable storage medium of claim 20, wherein the second multimedia data stream is obtained from a camera of the client device.

22. The non-transitory computer readable storage medium of claim 20, wherein the multimedia data stream includes video data, and wherein the generation of the third multimedia data stream is based on pixel by pixel differences between the video data of the first and second multimedia data streams.

23. The non-transitory computer readable storage medium of claim 20, further comprising:
    filtering a fourth multimedia data stream to generate the first multimedia data stream;
    generating a fifth multimedia data stream based on differences between the fourth multimedia data stream and the first multimedia data stream;
    compressing the fifth multimedia data stream to generate a third compressed multimedia data stream; and
    transmitting the third compressed multimedia data stream to the server.

24. The non-transitory computer readable storage medium of claim 20, wherein the server is configured to distribute data derived from the first compressed multimedia data stream to a second client device and to selectively distribute data derived from the second compressed multimedia data stream to the second client device based on a throughput available between the server and the second client device.

* * * * *